United States Patent [19]

Koskiniemi

[11] Patent Number: 5,607,549

[45] Date of Patent: Mar. 4, 1997

[54] METHOD FOR THE MANUFACTURE OF COOKING LIQUORS OF DIFFERENT SULPHIDITY BY GREEN LIQUOR CRYSTALLIZATION

[75] Inventor: Juha Koskiniemi, Kyminlinna, Finland

[73] Assignee: Ahlstrom Machinery Corporation, Noormarkku, Finland

[21] Appl. No.: 490,734

[22] Filed: Jun. 15, 1995

[30] Foreign Application Priority Data

Jun. 17, 1994 [FI] Finland ................................ 942902

[51] Int. Cl.$^6$ .................................................. D21C 11/04
[52] U.S. Cl. ........................ 162/30.11; 162/29; 162/47; 423/184; 423/195; 423/206.2
[58] Field of Search ...................... 162/29, 30.1, 30.11, 162/47; 423/184, 206 T, 426, 195

[56] References Cited

U.S. PATENT DOCUMENTS

| | | |
|---|---|---|
| 1,906,886 | 5/1933 | Richter . |
| 2,711,430 | 6/1955 | Hagglund et al. .................. 162/30.11 |
| 3,762,989 | 10/1973 | Timpe ........................ 162/16 |
| 3,909,344 | 9/1975 | Lukes ........................ 162/17 |
| 3,966,874 | 6/1976 | Featherston et al. .................... 423/121 |
| 4,093,508 | 6/1978 | Henricson ................. 162/30 K |
| 4,131,508 | 12/1978 | Laakso .................... 162/30 K |
| 4,138,312 | 2/1979 | Gill et al. .................... 162/30 |
| 4,872,950 | 10/1989 | Andersson et al. .................... 162/30.1 |
| 4,953,607 | 9/1990 | Erkki et al. .................... 162/30.11 |

FOREIGN PATENT DOCUMENTS

| | | |
|---|---|---|
| 792645 | 8/1968 | Canada . |
| 1103412 | 6/1981 | Canada . |
| WO94/09204 | 4/1994 | WIPO . |

OTHER PUBLICATIONS

"The manufacture of sulfur–free alkali in a kraft pulp mill, Part I. A New process for balancing sulfur and sodium in a closed cycle mill", Ulgrem et al, NORDIC PULP AND PAPER RESEARCH JOURNAL, no. Apr. 1988, pp. 191–197.

"The manufacture of sulfur–free alkali in a kraft pulp mill, Part II. The chemistry of the Alby process", Ulmgren et al, NORDIC PULP AND PAPER RESEARCH JOURNAL no. Mar. 1990, pp. 126–133.

Solveig Norden, "Modified Kraft Processes for Softwood . . . ", TAPPI, Jul. 1979, vol. 62, No. 7, pp. 49–51.

"The Effluent Free Bleached . . . " Part IV.–The Salt Recovery Process Reeve et al; Pulp & Paper Magazine of Canada, vol. 75, No. 8, Aug. 1974.

(List continued on next page.)

*Primary Examiner*—Donald E. Czaja
*Assistant Examiner*—Dean T. Nguyen
*Attorney, Agent, or Firm*—Nixon & Vanderhye P.C.

[57] ABSTRACT

Cooking liquors of significantly different sulphidity (e.g. one having a sulphidity about 30–40% and the other a sulphidity of above 40%, e.g. about 60–70%) may be produced in a simple energy-efficient manner. Black liquor is treated to recover chemicals, and the chemicals are dissolved to produce green liquor, which is clarified, as is conventional. The temperature of a first portion of the green liquor is decreased to effect crystallization of sodium carbonate in the green liquor by expanding the green liquor in at least two (and typically more than three) stages with vapor being produced during expansion. The sodium carbonate crystals produced are separated from the first portion of green liquor to produce a green liquor with high sulphidity (greater than about 40%) and this high sulphidity liquor may be heated by bringing it into direct heat exchange relationship with at least part of the expansion vapor (in a number of different stages). The separated sodium carbonate crystals are dissolved to produce a low sulphide content alkaline solution, which may be heated by bringing it into indirect heat exchange relationship with a second part of the expansion vapor. Heat recovered from the last expansion stage may be used to assist in dissolving the sodium carbonate crystals, as by using a heat pump system. The second portion of the clarified green liquor is used to produce a second green liquor having a sulphidity at least about 10% lower than the high sulphidity green liquor.

19 Claims, 2 Drawing Sheets

OTHER PUBLICATIONS

"Chemical Recovery Technology For Future Fiber . . . ", Ryham et al,. 80th Annual Meeting, Technical Section, CPPA, pp. B179–190, Jan. 31, 1994.

Reeve & Rapson "The Recovery of Sodium Chloride . . . " Pulp & Paper Magazine of Canada, vol. 71, No. 13, Jul. 3, 1970.

Reeve & Rapson, "The Effluent–free Bleached Kraft . . . ", Pulp & Paper Magazinen of Canada, vol. 74, No. 1, Jan., 1973.

Rapson & Reeve, "The Effluent–Free Bleached Kraft . . . " TAPPI, vol. 56, No. 9, Sep., 1973.

"Studies of Green Liquor Cooling Crystallization and Its Application to NaCl Removal . . . " Henricson et al, Paper och Tra, No. 10, 1975.

"The Solubility of Sodium Carbonate in Sodium Sulfide Solutions," Han et al; TAPPI, vol. 43, No. 5, May, 1960.

METHOD FOR THE MANUFACTURE OF COOKING LIQUORS OF DIFFERENT SULPHIDITY BY GREEN LIQUOR CRYSTALLIZATION

BACKGROUND AND SUMMARY OF THE INVENTION

The present invention relates to the manufacture of different cooking liquors (or like liquids) utilizable in a cellulose pulp mill by green liquor crystallization. The method is based upon the simple but effective and energy-efficient separation of sodium carbonate from green liquor.

In sulphate cooking wood is traditionally treated with "white liquor" containing sodium hydroxide and sodium sulphide. Lignin is dissolved and cellulose fibers are released. A mixture of cellulose fibers (pulp) and cooking chemicals is treated with water, producing "black liquor". Black liquor containing dissolved lignin and cooking chemicals is evaporated and then combusted in a recovery boiler (or gasified, or otherwise treated), to recover energy and chemicals. Depending on the combustion technique used, chemicals are obtained in a molten or solid phase, which are dissolved so as to form "green liquor" containing sodium sulphide and sodium carbonate. Usually the green liquor is causticized with caustic lime (CaO) to white liquor containing sodium hydroxide and sodium sulphide.

Typically, the sulphidity of cooking liquor has been 30–40% (sulphidity refers to the ratio of the amount of sodium sulphide to the total amount of sodium sulphide and sodium hydroxide). It is, however, known that by increasing the sulphidity of the white liquor, it is possible to produce pulp having a higher viscosity and better physical properties. It is also known that the sooner in the cooking sequence the sulphidity of white liquor becomes high, the clearer the advantages. Consequently, it is desirable to provide cooking liquors with different sulphidities at different stages of cooking. White liquor with high sulphidity (i.e. at least about 40%) is used at the beginning of cooking, and liquor with low sulphidity (e.g. less than about 30%) or normal sulphidity is supplied to the later stages of cooking. In the most extreme cases white liquor may contain only sodium hydroxide as an active substance.

Several technical and practical features have prevented the utilization of different sulphidity white liquors in commercial chemical cellulose pulp manufacture. One problem has been how to manufacture different sulphidity white liquors in a highly energy-efficient manner.

It is possible to use green liquor to produce green or white liquor with high sulphidity and liquid containing substantially only sodium hydroxide by crystallizing sodium carbonate out from green liquor, and causticizing it. The sodium hydroxide solution made from the separated sodium carbonate crystals may be used in different parts of the pulp mill.

The crystallization of sodium carbonate in the green liquor may be practiced by conventional evaporation techniques, such as by rising heat for evaporating water and raising thus the sodium carbonate content in the green liquor above the crystallization level. However if this kind of evaporation is employed the investment and operation costs must be optimized. If, for example, a multiple effect evaporation plant is used, the number of the effects decreases the amount of the primary steam required but adds significantly to the apparatus/equipment costs (initial investment and maintenance).

Conventional evaporation is suitable when the object is to increase concentration, for example, to improve the combustibility (black liquor). The purpose in the green liquor crystallization is, however, to separate sodium carbonate. It is known that the solubility of sodium carbonate in green liquor is at the lowest level at low temperature (<20° C.), at which solubility is less than 10 weight-%. Thus the crystallization of sodium carbonate is easier at these low temperatures. If crystallization were carried out directly as vacuum evaporation, the problem would be a low temperature level. For the energy economics of a pulp mill, it is desirable that the temperature of the final products be as high as possible.

A purpose of the present invention is to provide a method for the manufacture of cooking liquors of at least two different sulphidities in an as energy-efficient manner as possible.

According to one aspect of the present invention a method of manufacturing cooking liquor for digesting comminuted cellulosic material to produce chemical cellulose pulp, black liquor being produced during the production of chemical cellulose pulp, is provided. The method comprises the following steps: (a) Treating black liquor to recover chemicals therefrom. (b) Dissolving the chemicals from step (a) to produce green liquor. (c) Decreasing the temperature of the green liquor from step (b) to effect crystallization of sodium carbonate in the green liquor by expanding the green liquor in at least two stages, vapor being produced during expansion. (d) Separating the sodium carbonate crystals produced during the practice of step (c) to produce a green liquor with high sulphidity. (e) Heating the high sulphidity green liquor from step (d) with at least part the expansion vapor produced during step (c) by bringing the expansion vapor and high sulphidity green liquor into heat exchange relationship. And, (f) dissolving the sodium carbonate crystals separated in step (d) to produce a low sulphide content alkaline solution.

Step (e) is preferably practiced by bringing the vapor and green liquor into direct heat exchange relationship. Step (e) may be practiced using a first part of the expansion vapor from step (c), in which case there is a further step (g) of heating the low sulphide content alkaline solution from step (fi by bringing it into indirect heat exchange relationship with a second part of the expansion vapor from step (c). Step (c) is preferably practiced by expanding the green liquor in at least three expansion stages including a last, lowest temperature, expansion stage, and there are the further steps of (h) recovering heat from the last expansion stage (for example by using a heat pump system), and (i) using the heat recovered in step (h) to assist in the practice of step (fl.

In a typical method according to the present invention, step (a) is practiced by burning black liquor in a recovery boiler, or by gasifying black liquor, although other known techniques may be used. There is also typically the further step of clarifying the green liquor between steps (b) and (c), and step (c) is typically practiced using more than three stages. Also the high sulphidity green liquor and the low sulphide content alkaline solution may either or both be causticized.

There is also typically the further step (j) of dividing the green liquor from step (b) into first and second portions, the first portion used in the practice of steps (c)–(e), and the second portion treated to produce a second stream of green liquor having a sulphidity at least 10% (and preferably at least about 20%) lower than the high sulphidity green liquor from step (e). Steps (a) through (e) may be practiced to produce as the high sulphidity green liquor a green liquor having a sulphidity of about 60–70%, and the second stream of green liquor will typically have a sulphidity of about 30–40%, although it can be made with lower sulphidity (e.g. 20% or less).

Step (c) may be practiced to reduce the temperature of the green liquor from about 85–95 (e.g. about 90° C.) to about 14–20 (e.g. about 16° C.) between the first and last stages. Step (e) may be practiced to produce high sulfidity green liquor having a temperature of about 65–75 (e.g. about 69° C.), while step (g) is practiced to heat the low sulphide content alkaline solution to a temperature of about 65–75 (e.g. about 69° C.) Step (c) is typically practiced using flash tanks for at least some of the stages, and typically all of them.

According to another aspect of the present invention a method of manufacturing cooking liquor is provided comprising the following steps: (a) Treating black liquor to recover chemicals therefrom. (b) Dissolving the chemicals from step (a) to produce green liquor, and clarifying the green liquor so produced. (c) Dividing the clarified green liquor from step (b) into first and second portions. (d) Decreasing the temperature of the first portion of the green liquor to effect crystallization of sodium carbonate in the green liquor by expanding the green liquor in at least two stages, vapor being produced during expansion. (e) Separating the sodium carbonate crystals produced during the practice of step (d) to produce a green liquor with high sulphidity. (f) Dissolving the sodium carbonate crystals separated in step (e) to produce a low sulphide content alkaline solution. And, (g) using the second portion of green liquor from step (c) to produce a second stream of green liquor having a sulphidity at least 10% lower than the high sulphidity green liquor from step (e). This method also typically comprises the further steps of: bringing a first part of the expansion vapor from step (d) into direct heat exchange relationship with the high sulphidity green liquor from step (e) to heat the high sulphidity green liquor; and heating the low sulphide content alkaline solution from step (f) by bringing it into indirect heat exchange relationship with a second part of the expansion vapor from step (d).

It is the primary object of the present invention to provide an effective energy-efficient method for producing high sulphidity cooking liquor. This and other objects of the invention will become clear from an inspection of the detailed description of the invention and from the appended claims.

DETAILED DESCRIPTION OF THE DRAWINGS

Figure 1:
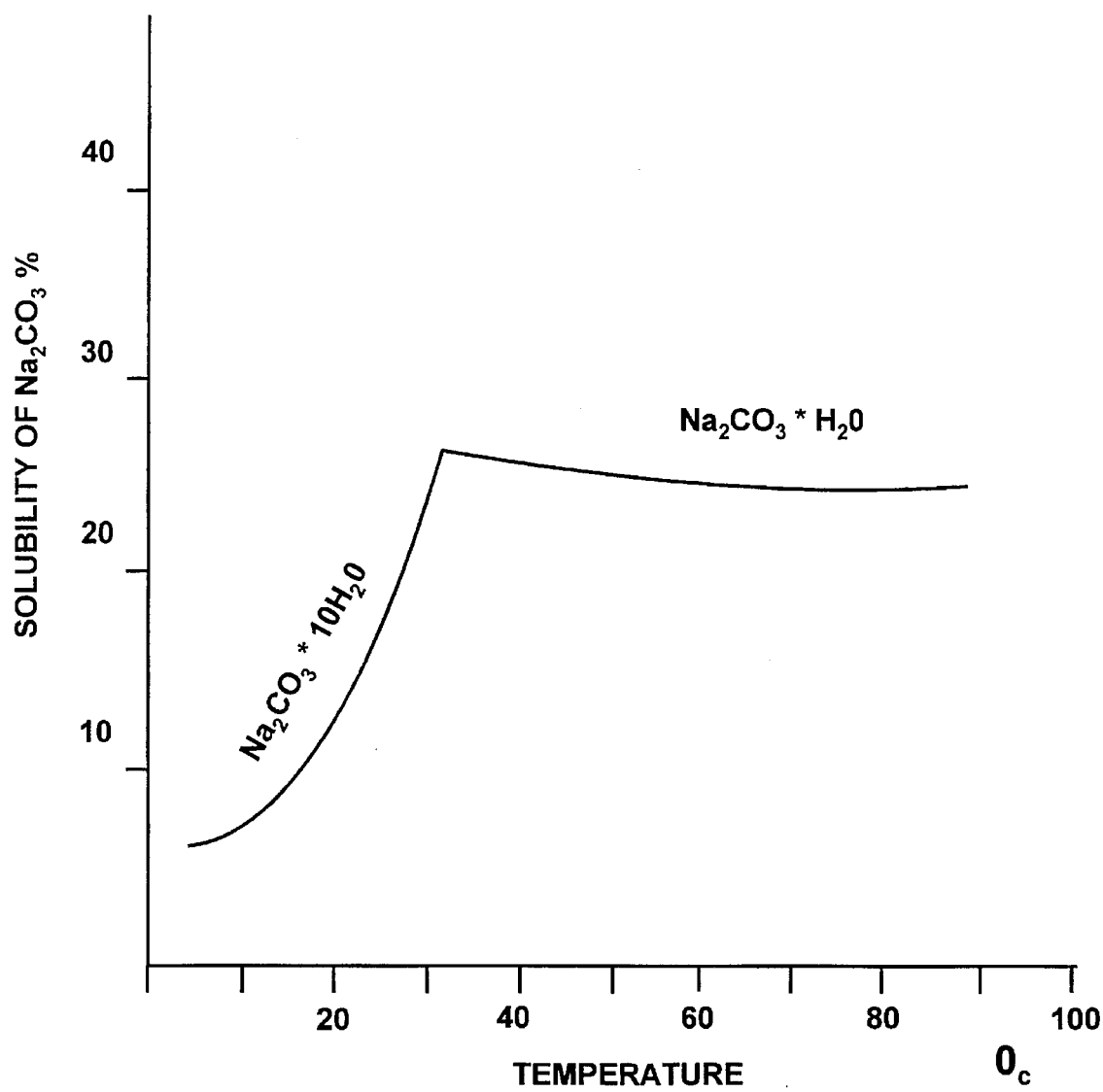
FIG. 1 is a graphical representation plotting the solubility of sodium carbonate with respect to temperature.

FIG. 1 illustrates how sodium carbonate crystallizes at 5°–20° C. producing pure decahydrate crystals and at 35°–90° C. producing monohydrate crystals. (Hahn, S. T. and Whitney, R. P.; Tappi, Vol. 43 (1960), No. 5, p. 420.) The crystallization of sodium carbonate becomes easier at a low temperature (<20° C.), because its solubility in green liquor is less than 10 weight-%. For the energy economics of a pulp mill, it is desirable that the temperatures of the final products be as high as possible. According to the invention a method is provided in which the temperatures of the final products are energy-economy advantageous, even though sodium carbonate crystallization may be carried out at low temperature.

Figure 2:
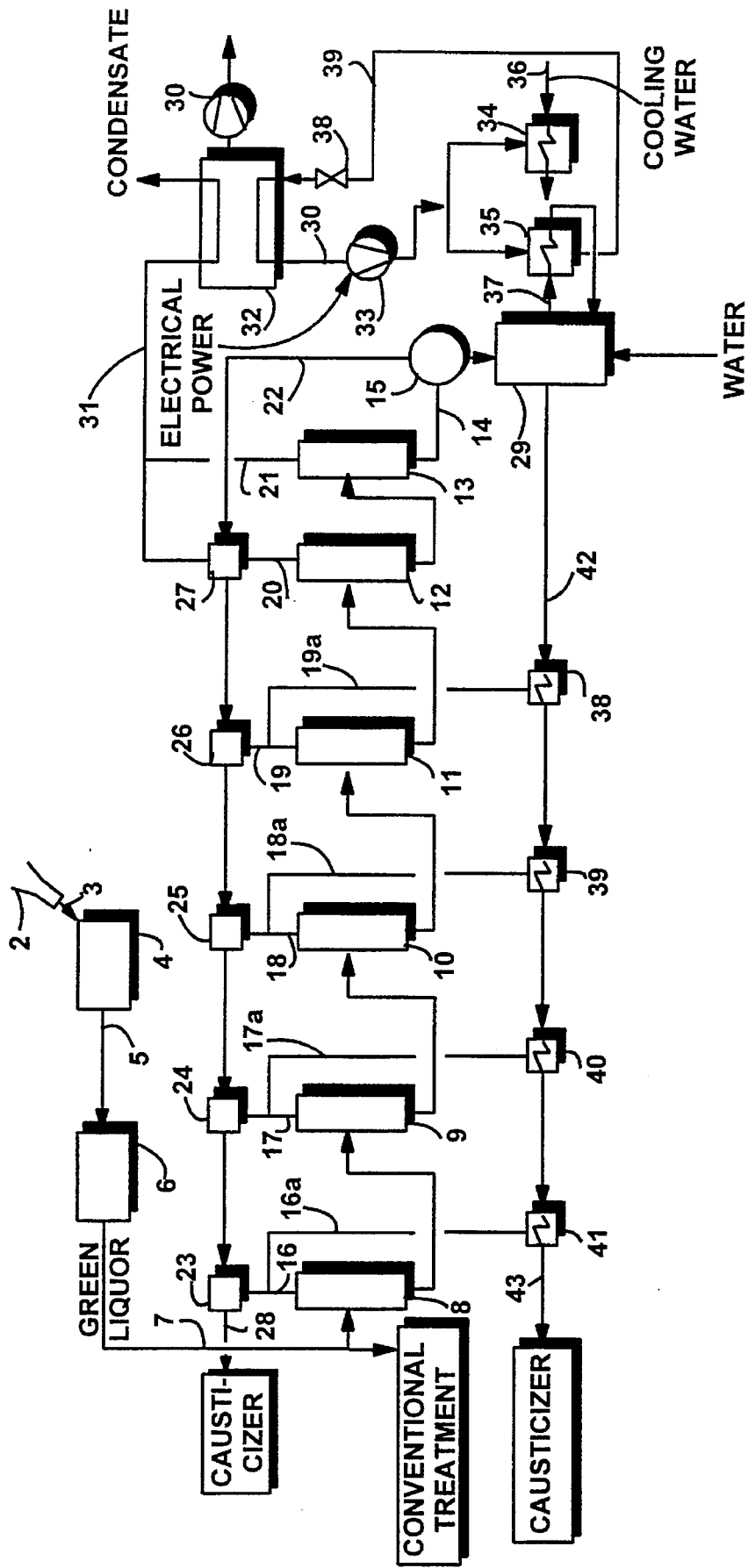
FIG. 2 schematically illustrates exemplary apparatus for practicing the methods according to the present invention.

FIG. 2 schematically illustrates a melt 3 that is obtained from a conventional soda recovery boiler 2, which melt 3 is dissolved in a conventional dissolver 4 so as to form green liquor 5. Also any other corresponding treatment method or device for recovering chemicals from black liquor, such as gasification, may be used instead of the conventional soda recovery boiler 2. The green liquor is clarified at 6, as is conventional, by settling or filtering so as to remove the dregs. The clarified green liquor is transported in conduit 7 to expansion evaporation apparatus (flash tanks 8–13). By utilizing a method in accordance with the invention it is possible to treat either the whole of the green liquor flow in a pulp mill or part of it, depending on what kind of cooking liquors are required. Part of the green liquor (e.g. that divided out in line 7') may be treated in a conventional way to produce a white liquor with a normal (about 30–40%) or lower (less than about 30%) sulphidity.

Expansion evaporation is performed in several stages in flash tanks 8–13. Green liquor is brought to the flash tank 8, for example, at a temperature of about 85°–95° (e.g. about 90° C.) and is discharged from the last vessel 13 at a temperature of about 14–20 (e.g. about 16° C.) As the temperature of the green liquor decreases during expansion, sodium carbonate is crystallized from the green liquor. The green liquor with the sodium carbonate crystals remaining from the last stage (flash tank 13) is passed to a conventional filter 15 through a conduit 14 for crystal separation. Vacuum for effecting expansion may be provided by a vacuum pump 30.

During expansion, vapor is discharged from the green liquor in each stage, and the vapor is passed to conduits 16–21. Most of the vapor in the first stages is preferably brought into direct heat exchange contact with the green liquor obtained in the crystal so separation, which is passed along line 22 from the filter 15 to direct heat exchangers 23–27. The temperature of the green liquor flowing in a line 28 is about 65–75 (e.g. about 69° C.) It has a high sulphidity (greater than 40%), preferably about 60–70%, and it may be used in the impregnation stage of the cooking without causticizing. If desired it may, of course, be causticized.

The sodium carbonate crystals separated by the filter 15 are passed along the conduit 28 to a conventional dissolver 29. Dissolution requires heat, which is obtained from the vapors 20, 21 of the last expansion stages. The vapors in lines 20, 21 from stages 12, 13 are passed along line 31 to a heat pump system known per se. The heat pump system comprises a circuit for a refrigerant liquid. The circuit includes heat exchangers 32, 34 and 35, a compressor 33 and an expansion valve 38. Condensable gases are removed by a vacuum pump 30. The circuit of the refrigerant liquid is schematically indicated at 39 in FIG. 2. The heat of the vapor in line 31 transfers to circulated refrigerant liquid in heat exchanger 32, so that the vapor 31 is condensed and the refrigerant liquid is vaporized. The temperature and the pressure of the vapor of the refrigerant liquid is increased by compressor 33. The vapor condenses and releases heat in heat exchanger 34 to the cooling water 36 and in heat exchanger 35 to crystal solution 37, which is circulated through heat exchanger 35. Thus the heat derived from the vapor in line 31 is used as dissolving heat for crystals. The refrigerant liquid is led through an expansion valve 38, by which the pressure is reduced and then to a heat exchanger 32, in which the liquid is again vaporized.

The alkaline solution 42 obtained from dissolver 29 and containing only a small amount of sulphide is heated in indirect heat exchangers 38–41 with expansion vapors 16a–19a. The alkali solution 43 at a temperature of about 65–75 (e.g. about 69° C.) may be causticized and the sodium hydroxide solution may be utilized in the later stages of pulp digestion, in oxygen delignification, bleaching and as alkaline washing liquid for gas scrubbers. In other words, the method in accordance with the present invention may be utilized in supplying all the sodium hydroxide needs of a pulp mill.

A method in accordance with the present invention may be utilized for the manufacture of different solutions for the need of a pulp mill in a very energy-economic way. If a compressor heat pump system 32–35 is used, the required electric power is less than 10% of the power required by a conventional four-effect evaporation plant.

The present invention is not limited to the embodiments illustrated herein as examples, but different details may vary within the inventive concept defined by the patent claims. In some cases it may, for example, be better to use in some stages of the process conventional evaporation by means of inexpensive waste heat or compressor heat pump evaporation, to increase the sodium carbonate content and thus to improve crystallization. Heat thus released may be utilized along with heat from the expansion vapors. Thus the invention is to be accorded the broadest interpretation of the appended claims so as to encompass all equivalent methods and processes.

What is claimed is:

1. A method of manufacturing cooking liquors of different sulphidity for digesting comminuted cellulosic material to produce chemical cellulose pulp, black liquor being produced during the production of chemical cellulose pulp, said method comprising the steps of:

(a) treating black liquor to recover chemicals therefrom;
    (b) dissolving the chemicals from step (a) to produce green liquor;
    (c) decreasing the temperature of the green liquor from step (b) to effect crystallization of sodium carbonate in the green liquor by expanding the green liquor in at least two stages, vapor being produced during expansion;
    (d) separating the sodium carbonate crystals produced during the practice of step (c) to produce a green liquor with high sulphidity;
    (e) heating the high sulphidity green liquor from step (d) with at least part the expansion vapor produced during step (c) by bringing the expansion vapor and high sulphidity green liquor into heat exchange relationship; and
    (f) dissolving the sodium carbonate crystals separated in step (d) to produce a low sulphide content alkaline solution.

2. A method as recited in claim 1 wherein step (e) is practiced by bringing the vapor and green liquor into direct heat exchange relationship.

3. A method as recited in claim 2 wherein step (e) is practiced using a first part of the expansion vapor from step (c); and comprising the further step (g) of heating the low sulphide content alkaline solution from step (f) by bringing it into heat exchange relationship with a second part of the expansion vapor from step (c).

4. A method as recited in claim 3 wherein step (g) is practiced by bringing the alkaline solution and second part of the expansion vapor into indirect heat exchange relationship with each other.

5. A method as recited in claim 3 wherein step (g) is practiced to heat the low sulphide content alkaline solution to a temperature of about 65–75 degrees C.

6. A method as recited in claim 2 comprising the further step, after step (e), of causticizing the green liquor from step (e); wherein step (e) is practiced in a plurality of stages.

7. A method as recited in claim 1 wherein step (c) is practiced by expanding the green liquor in at least three expansion stages including a last, lowest temperature, expansion stage; and comprising the further steps of (h) recovering heat from the last expansion stage, and (i) using the heat recovered in step (h) to assist in practicing step (f).

8. A method as recited in claim 7 wherein step (h) is practiced using a heat pump system.

9. A method as recited in claim 1 comprising the further step of causticizing the low sulphide content alkaline solution from step (f).

10. A method as recited in claim 1 comprising the further step (j) of dividing the green liquor from step (b) into first and second portions, the first portion used in the practice of steps (c)–(e), and the second portion treated to produce a second stream of green liquor having a sulphidity at least 10% lower than said high sulphidity green liquor from step (e).

11. A method as recited in claim 1 wherein steps (a)–(e) are practiced to produce as the high sulphidity green liquor a green liquor having a sulphidity of about 60–70%.

12. A method as recited in claim 11 comprising the further step (j) of dividing the green liquor from step (b) into first and second portions, the first portion used in the practice of steps (c)–(e), and the second portion treated to produce a second stream of green liquor having a sulphidity at least 10% lower than said high sulphidity green liquor from step (e).

13. A method as recited in claim 1 wherein step (c) is practiced to reduce the temperature of the green liquor from about 85–95 degrees C to about 14–20 degrees C between the first and last stages.

14. A method as recited in claim 13 wherein step (e) is practiced to produce high sulphidity green liquor having a temperature of about 65–75 degrees C.

15. A method as recited in claim 1 wherein step (a) is practiced by burning black liquor in a recovery boiler, or by gasifying black liquor.

16. A method as recited in claim 1 comprising the further step (k) of clarifying the green liquor between steps (b) and (c).

17. A method as recited in claim 1 wherein step (c) is practiced using more than three stages.

18. A method as recited in claim 1 wherein step (c) is practiced using flash tanks as at least some of the stages.

19. A method of manufacturing cooking liquors of different sulphidity for digesting comminuted cellulosic material to produce chemical cellulose pulp, black liquor being produced during the production of chemical cellulose pulp, said method comprising the steps of:

(a) treating black liquor to recover chemicals therefrom;
    (b) dissolving the chemicals from step (a) to produce green liquor, and clarifying the green liquor so produced;
    (c) dividing the clarified green liquor from step (b) into first and second portions;
    (d) decreasing the temperature of the first portion of the green liquor to effect crystallization of sodium carbonate in the green liquor by expanding the green liquor in at least two stages, vapor being a produced during expansion;
    (e) separating the sodium carbonate crystals produced during the practice of step (d) to produce a green liquor with high sulphidity;

(f) dissolving the sodium carbonate crystals separated in step (e) to produce a low sulphide content alkaline solution;

(g) using the second portion of green liquor from step (c) to produce a second stream of green liquor having a sulphidity at least 10% lower than the high sulphidity green liquor from step (e);

(h) bringing a first part of the expansion vapor from step (d) into direct heat exchange relationship with the high sulphidity green liquor from step (e) to heat the high sulphidity green liquor; and (i) heating the low sulphide content alkaline solution from step (f) by bringing the alkaline solution into indirect heat exchange relationship with a second part of the expansion vapor from step (d).

* * * * *